Nov. 11, 1941.  I. C. COOPER  2,262,384
AIR CONDITIONER FOR MOTOR VEHICLES
Filed March 1, 1940  2 Sheets—Sheet 1

Inventor
I. C. Cooper.
By Ross J. Woodward
Attorney

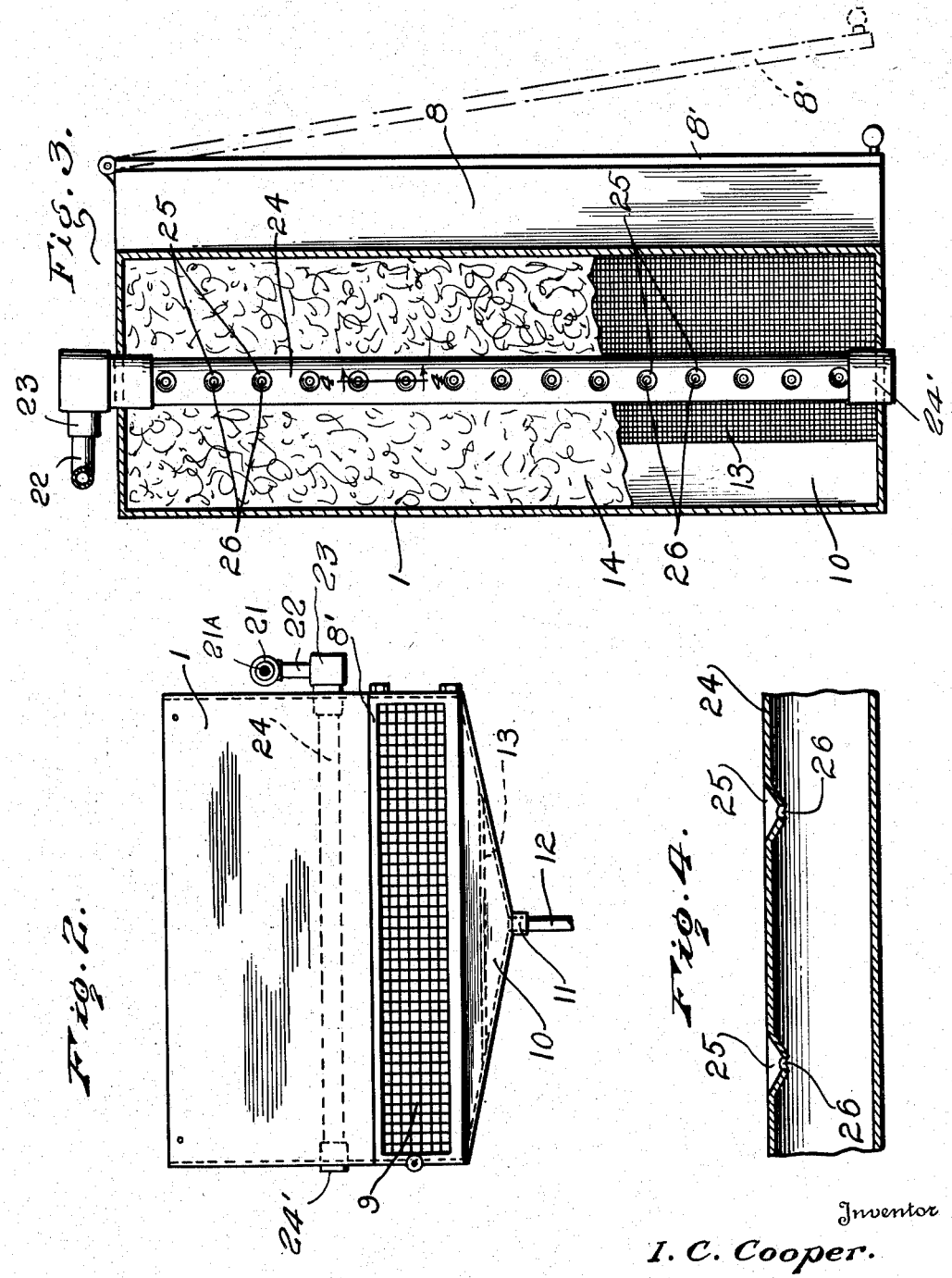

Patented Nov. 11, 1941

2,262,384

UNITED STATES PATENT OFFICE 2,262,384

AIR CONDITIONER FOR MOTOR VEHICLES

Izates C. Cooper, Lakeside, Calif.

Application March 1, 1940, Serial No. 321,773

2 Claims. (Cl. 261—98)

This invention relates to an air conditioner for automobiles or other vehicles and it is one object of the invention to provide a device of this character which may be installed in connection with an air scoop such as now used for delivering air into the body portion of an automobile at the front thereof.

Another object of the invention is to so form the air conditioner that when it is installed on an automobile and the automobile is driven forwardly, air will be passed through the conditioner and so treated that it will be cooled and dust and other foreign matter removed.

Another object of the invention is to so form the air conditioner that as air is passed through the conditioner it will be passed through a moist mass of excelsior or the like and delivered into the automobile as moist air instead of in a hot and dry condition.

Another object of the invention is to provide an air conditioner wherein water is delivered from a water tank to a nozzle or distributer pipe so mounted in the air conduit that water will be evenly deposited upon the excelsior or equivalent material in the lower portion of the conduit.

Another object of the invention is to provide an air conditioner having a valve provided with an actuating stem so arranged that it may be easily reached by the driver of the automobile and the valve adjusted to regulate flow of water from openings in the distributer pipe.

Another object of the invention is to provide an air conditioner wherein the excelsior or equivalent absorbent material is so supported that air can readily pass through it and surplus water drain from the absorbent material and flow out through a drain pipe.

Another object of the invention is to so form the distributer pipe that water is discharged therefrom through its upper portion at points spaced from each other longitudinally of the pipe, thus evenly distributing the water upon the absorbent material over which the pipe is mounted.

Another object of the invention is to provide an air conditioner which is simple in construction and capable of being readily installed in an automobile of conventional form.

The invention is illustrated in the accompanying drawings, wherein:

Fig. 2 is a view in elevation looking at the discharge side of the distributer body or conduit.

Fig. 3 is a transverse sectional view taken on the line 3—3 of Fig. 1.

Figure 4 is a sectional view on an enlarged scale, taken longitudinally through the distributer pipe on the line 4—4 of Fig. 3.

Figure 1:
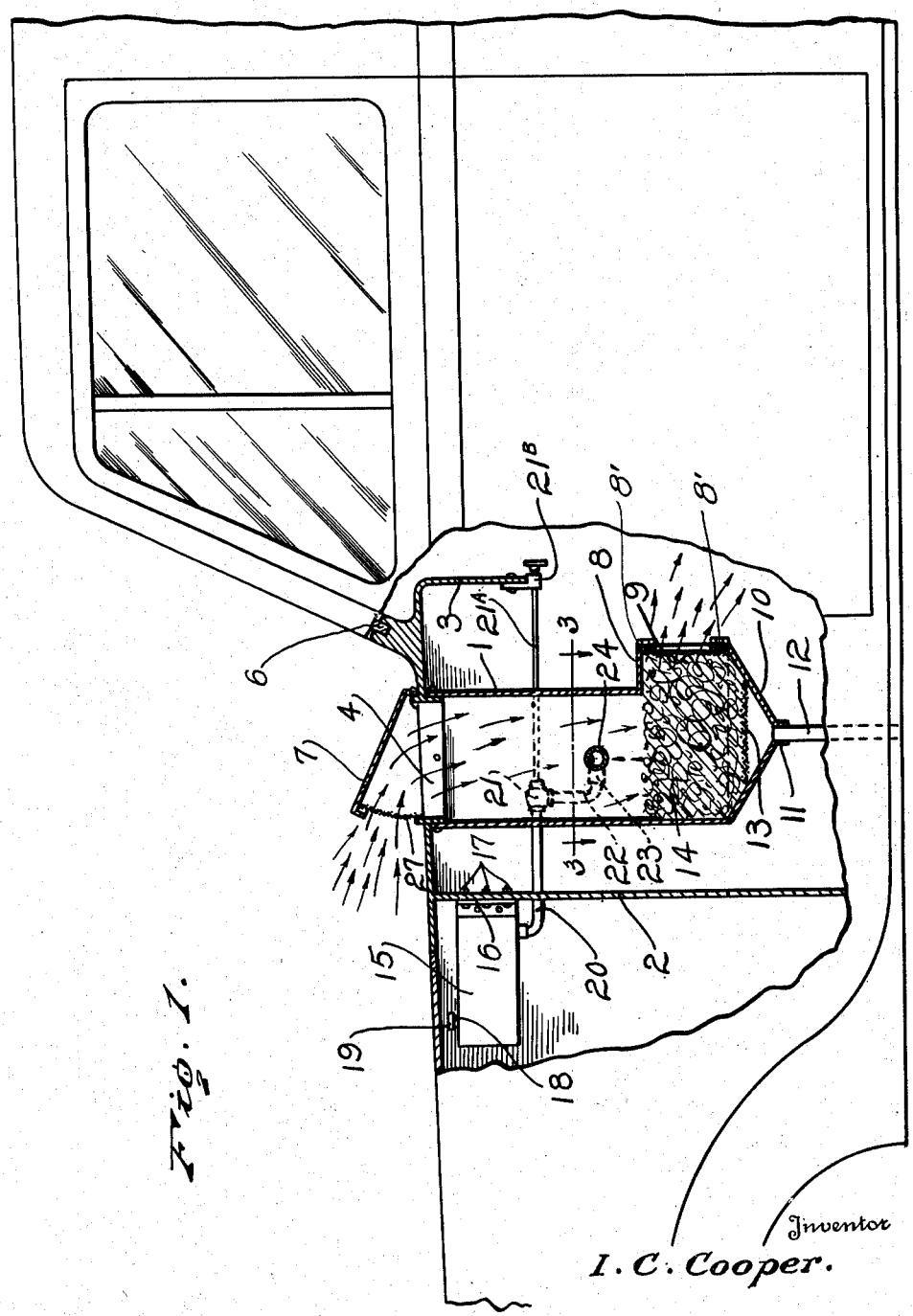
Fig. 1 is a view partially in vertical section and partially in side elevation and showing the improved air conditioner installed in an automobile.

This improved air conditioner is to be installed in an automobile of conventional construction and has been shown installed for use in Fig. 1. Referring to this figure, it will be seen that the body or air conduit 1 is disposed vertically between the dashboard 2 and the instrument board 3, with its upper end surrounding the lower portion of the inlet neck 4 extending vertically through the cowl 5 in front of the windshield 6. The usual scoop 7 is provided as an adjustable closure for the upper end of the neck and conventional means will be provided for adjusting the scoop or cover to control flow of air through the body 1 of the conditioner.

The lower portion of the body 1 is enlarged to form an extension 8 which projects rearwardly from the body for the full width thereof and has a rear closure such as the door 8' formed with an opening guarded by a screen 9, the door being hinged or otherwise removably mounted in order that access may be had to the lower portion of the casing. By this arrangement, air may flow through the body or conduit and out of the discharge opening in the closure downwardly into the forward portion of the automobile. The lower portion of the body is tapered downwardly to form a bottom 10 which converges toward its center where it is provided with a short neck 11 in which the upper end of the drain pipe 12 is secured. By this arrangement, surplus water will gravitate along the bottom of the body to the neck 11 and flow through the drain pipe which is of sufficient length to pass through the bottom of the automobile. A false bottom or grating 13 formed of foraminous material is mounted in the tapered body 10 to support a quantity of absorbent material 14 which may be excelsior or the like, and it should be noted that the absorbent material extends from the grating or false bottom to the top of the rearwardly projecting portion 8 of the body. Therefore, the absorbent material will be confined in the lower portion or chamber 8 of the body and prevented from shaking loose. This absorbent material is thrust into the body through the open rear end of the extension 8 and the door then closed to confine the absorbent material in the body. If so desired, the door may be omitted and the screen removably secured in any desired manner in shielding relation to the open rear end of the extension.

In order to moisten the absorbent material, there has been provided a source of water consisting of a tank 15 mounted at any suitable place but shown under the cowl and secured against the front face of the dashboard 2 by brackets 16, one of which is riveted to each side of the tank and secured to the dashboard by a suitable number of bolts 17. A filling neck 18 having a removable cap 19 extends upwardly from the front of the tank and an outlet pipe 20 leads from adjacent the rear end of the tank. This pipe extends rearwardly through the dashboard at one side of the body or air conduit 1 and carries a valve 21 from which leads a depending pipe 22. The stem 21a of the valve extends rearwardly from the body 1 and is journaled through the bearing bracket 21b carried by the instrument board 3. The pipe 22 extends downwardly with its lower end curved rearwardly and connected with an elbow or coupling 23 which passes through a side wall of the body and is secured to one end of a distributer pipe 24 extending transversely in the lower portion of the body. The other end of the pipe 24 is closed by a cap 24' and since this cap and the coupling 23 pass through opposite side walls of the body the pipe will be firmly supported in the body transversely thereof. The pipe 24 is located above the absorbent material in vertical spaced relation thereto, as shown in Fig. 1, and its upper portion is formed with depressions 25 having openings 26 at their centers. By this arrangement, water flowing from the tank through the pipes 20 and 22 into the distributer pipe or head 24 will pass out through the openings 26 and drip from the head onto the absorbent material 14. By properly adjusting the valve, flow of water through the pipes and the discharge head may be so regulated that the water will drip from the head and the absorbent material kept moist without water being wasted by flowing from the discharge pipe too fast. Any surplus water will drain from the absorbent material into the bottom of the body and pass out through the drain pipe 12 onto the ground under the automobile. As the air must pass through the moist absorbent material, as indicated by the arrows in Fig. 1, dust and other foreign matter will be removed therefrom and clean air, which has been cooled, will be discharged through the screening 9 into the automobile. The screen 27 carried by the cover 7 prevents insects or stones and the like from entering the upper end of the body. When it is necessary to renew the absorbent material, the door is opened and the screen removed, the absorbent material being then withdrawn through the open rear end of the extension 8' of the body and new absorbent material substituted. The screen is then replaced and the door closed. As previously explained, the door may be omitted and the screen detachably applied to guard the open rear end of the body.

Having thus described the invention, what is claimed is:

1. An air conditioner for vehicles comprising a vertical body having an air inlet at its top, the lower portion of said body being extended rearwardly whereby the body defines a vertical chamber having an enlarged lower portion constituting a rearwardly extending recess having side walls and an upper wall, said recess being open at its rear end to provide an air outlet, a foraminous shield for the outlet, absorbent material in the lower portion of said body extending into and filling the recess, and means for moistening the absorbent material including a perforated discharge pipe extending through the body over the absorbent material.

2. In an air conditioner for vehicles, a body having an upper air inlet and a lower air outlet, packing of absorbent material in the lower portion of said body in blocking relation to the air outlet whereby air passes through the absorbent material to reach the outlet, and means for supplying moisture to the absorbent material including a discharge pipe extending horizontally through the body in vertical spaced relation to the absorbent material and having its upper portion formed with outlet openings.

IZATES C. COOPER.